United States Patent
Takamura et al.

(10) Patent No.: US 8,897,944 B2
(45) Date of Patent: Nov. 25, 2014

(54) VEHICLE DRIVE FORCE CONTROL DEVICE

(75) Inventors: Yutaka Takamura, Yokohama (JP);
Hiroshi Arita, Kanagawa (JP);
Haruhisa Tsuchikawa, Yokohama (JP);
Hiroki Shimoyama, Kanagawa (JP);
Hiroyuki Ashizawa, Yokohama (JP)

(73) Assignee: Nissan Motor Co., Ltd., Yokohama-shi, Kanagawa (JP)

(*) Notice: Subject to any disclaimer, the term of this patent is extended or adjusted under 35 U.S.C. 154(b) by 0 days.

(21) Appl. No.: 13/879,852

(22) PCT Filed: Oct. 20, 2011

(86) PCT No.: PCT/JP2011/074111
§ 371 (c)(1),
(2), (4) Date: Jun. 24, 2013

(87) PCT Pub. No.: WO2012/053577
PCT Pub. Date: Apr. 26, 2012

(65) Prior Publication Data
US 2013/0274980 A1    Oct. 17, 2013

(30) Foreign Application Priority Data

Oct. 21, 2010 (JP) ................................. 2010-236520

(51) Int. Cl.
*B60L 11/00* (2006.01)
(Continued)

(52) U.S. Cl.
CPC ................. *B60W 20/10* (2013.01); *B60K 6/48* (2013.01); *B60K 6/547* (2013.01);
(Continued)

(58) Field of Classification Search
CPC ..... B60W 20/00; B60W 10/08; B60W 10/02; B60W 10/06; B60W 10/10; B60K 6/48; B60K 6/46; B60K 6/52; B60L 11/14
USPC .............. 701/22, 36, 84, 99; 180/65.1, 65.21, 180/65.26, 65.31, 65.7; 74/335, 337
See application file for complete search history.

(56) References Cited

U.S. PATENT DOCUMENTS 4,821,190 A * 4/1989 Patil ................................ 701/68
6,205,379 B1 * 3/2001 Morisawa et al. ............... 701/22
(Continued)

FOREIGN PATENT DOCUMENTS

JP   2009-132195 A   6/2009
JP   2009-162291 A   7/2009
(Continued)

*Primary Examiner* — Mary Cheung
*Assistant Examiner* — Rodney Butler
(74) *Attorney, Agent, or Firm* — Young Basile

(57) ABSTRACT

Provided herein is a vehicle drive force control. When a driver requests to start the vehicle with the brake OFF and depresses the accelerator pedal, a target drive torque exceeds a gradient load. To avoid excess current being supplied to the motor, the upper limit of motor speed, which is the input speed of a second clutch, is set to a value less than a slip detectable limit value at which it becomes possible to detect slip rotation, i.e. the difference over the output side rotation speed. When the target drive torque exceeds the gradient load, the lower limit of the input speed of the second clutch (the motor speed) is set to a value equal to or greater than the slip detectable limit value so that the required driving force can be achieved by the gradient load corresponding driving force control.

6 Claims, 10 Drawing Sheets

(51) Int. Cl.
   *B60W 20/00*   (2006.01)
   *B60K 6/48*   (2007.10)
   *B60K 6/547*   (2007.10)
   *B60L 15/20*   (2006.01)
   *B60W 10/02*   (2006.01)
   *F02D 29/02*   (2006.01)
   *F16D 48/06*   (2006.01)
   *B60W 10/06*   (2006.01)
   *B60W 10/08*   (2006.01)
   *B60L 3/00*   (2006.01)
   *B60L 11/14*   (2006.01)

(52) U.S. Cl.
   CPC ........... *B60L 15/2054* (2013.01); *B60W 10/02* (2013.01); *B60W 20/00* (2013.01); *F02D 29/02* (2013.01); *F16D 48/066* (2013.01); *B60W 10/06* (2013.01); *B60W 10/08* (2013.01); *B60L 3/0023* (2013.01); *B60L 11/14* (2013.01); *B60L 15/2081* (2013.01); *B60L 2240/30* (2013.01); *B60L 2240/507* (2013.01); *B60L 2250/26* (2013.01); *B60W 2550/142* (2013.01); *B60W 2710/105* (2013.01); *Y02T 10/6221* (2013.01); *Y02T 10/70* (2013.01); *Y02T 10/7077* (2013.01); *F16D 2500/1066* (2013.01); *F16D 2500/30406* (2013.01); *F16D 2500/50825* (2013.01); *F16D 2500/5106* (2013.01); *Y10S 903/93* (2013.01); *Y10S 903/946* (2013.01); *B60L 2210/40* (2013.01); *B60L 2240/12* (2013.01); *B60L 2240/36* (2013.01); *B60L 2240/421* (2013.01); *B60L 2240/423* (2013.01); *B60L 2240/441* (2013.01); *B60L 2240/443* (2013.01); *B60L 2240/642* (2013.01)
   USPC ........... 701/22; 180/65.26; 903/930; 903/946

(56) References Cited

U.S. PATENT DOCUMENTS

| 7,996,139 B2 * | 8/2011 | Okuda et al. ............... 701/93 |
| 2008/0071437 A1 * | 3/2008 | Hirata et al. ............... 701/22 |

FOREIGN PATENT DOCUMENTS

| JP | 2010-143448 A | 7/2010 |
| JP | 2010-149649 A | 7/2010 |
| JP | 2010-149640 A | 8/2010 |
| JP | 2010-202123 A | 9/2010 |

\* cited by examiner

1 ENGINE
5 MOTOR/GENERATOR
6 FIRST CL
7 SECOND CL
9 BATTERY
10 INVERTER

20 INTEGRATED CONTROLLER (ATCU)
21 ENGINE CONTROLLER (ECM)
22 MOTOR/GENERATOR CONTROLLER (MC)

FIG. 3

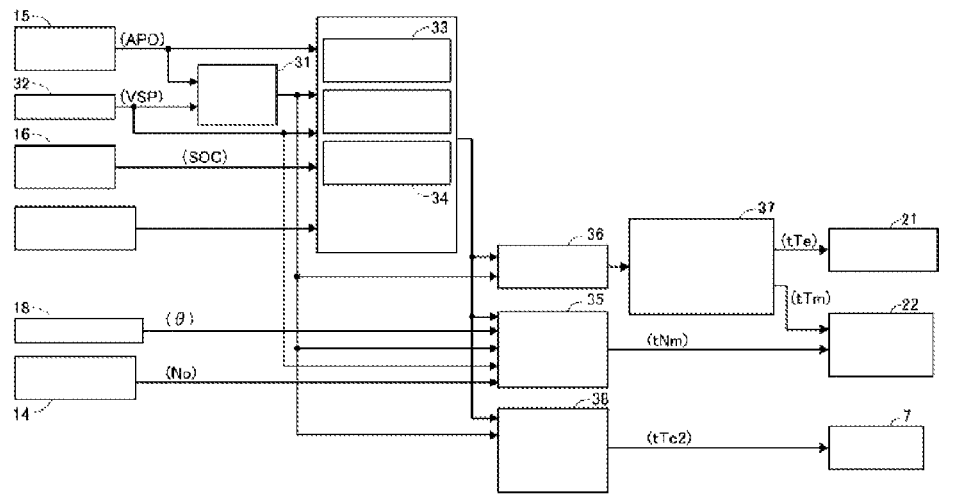

15 ACCELERATOR OPENING DEGREE SENSOR
32 VEHICLE SPEED CALCULATION SECTION
16 CHARGE STATE SENSOR
　　CLUTCH SLIP ROTATION SPEED CALCULATION SECTION
18 ROAD GRADIENT SENSOR
14 A/T OUTPUT ROTATION SPEED SENSOR

33 TARGET MODE CALCULATION SECTOIN
　　SECOND CLUTCH CONTROL STATE CALCULATION SECTION
34 MG CONTROL MODE SELECTION SECTION
36 TARGET INPUT TORQUE CALCULATION SECTION
35 TARGET INPUT ROTATION SPEED CALCULATION SECTION
38 TARGET SECOND CLUTCH CAPACITY CALCULATION SECTION

37 TARGET ENGINE TORQUE/TARGET MOTOR TORQUE CALCULATION SECTION

21 ENGINE TORQUE CONTROLLER
22 MOTOR?GENERATOR CONTROLLER
7 SECOND CLUTCH

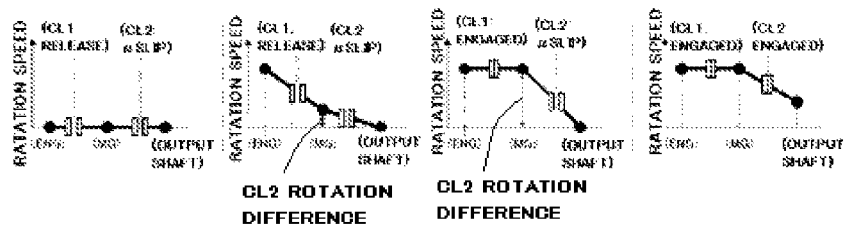

FIG. 5
ROTATION SPEED RELATIONSHIP AT VEHICLE STOPPED STATE

| DRIVE MODE SMODE | EV 2200 | MWSC (MOTOR WSC) 7700 | WSC 5500 | NEV 3300 |
|---|---|---|---|---|
| SUMMARY | MG ONLY FIRST TO SEVENTH SPEED RATIOS | CL2 HEAT GENERATION SUPPRESSION MODE AT FIRST ROAD GRADIENT ENG IS IN MOTOR, CL1 RELEASED, ONLY MG USED (≈EV) | ENG+MG FIRST SPEED RATIO ONLY | ENG+MG SECOND SPEED RATIO OR MORE |
| POWER SOURCE | MG (DISCHARGE ONLY) | (DISCHARGE ONLY) | ENG+MG (DISCHARGE OR CHARGE) | ENG+MG (DISCHARGE OR CHARGE) |
| CL1 | RELEASE | RELEASE | ENGAGE | ENGAGE |
| CL2 | μ SLIP (DURING TRAVEL) | μ SLIP → CL2 HEAT GENERATION | SLIP → CL2 HEAT GENERATION | ENGAGED |
| CL2 ROTATION DIFFERENCE | NO DIFFERENCE | SMALL → SMALL HEAT | LARGE → LARGE HEAT GENERATION | CL2 ENGAGED, NO HEAT GENERATION |
| MG CONTROL MODE | ROTATION | ROTATION CONTROL | ROTATION CONTROL | TORQUE CONTROL |
| DRIVING FORCE COMMAND TO: | ATCU | ATCU | ATCU, ECM(ENG) | ECM(ENG), MG(MG) |

31 TARGET DRIVE TORQUE CALCULATION SECTION
41 GRADIENT LOAD TORQUE CALCULATION SECTION
42 TARGET CL2 CLUTCH SLIP ROTATION SPEED CALCULATION SECTION

71 OFFSET COEFFICIENT CALCULATION SECTION
73 CHANGE RATE RESTRICTION SECTION

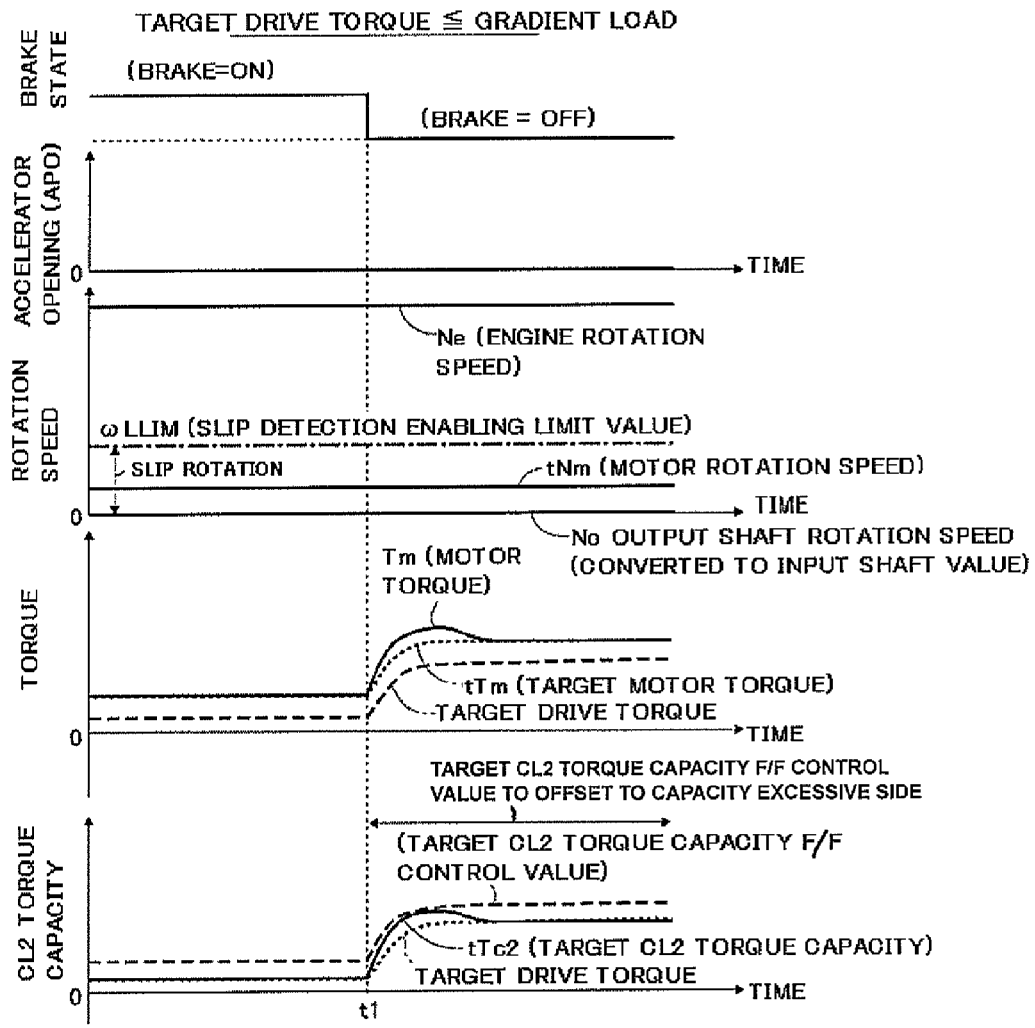

VEHICLE DRIVE FORCE CONTROL DEVICE

TECHNICAL FIELD

The present invention relates to a driving force control system for a vehicle that can travel by an engine or an electric motor as driving force and is equipped with a starting clutch between the power source and drive wheels. The present invention relates in particular to a system that performs appropriately the driving force control in accordance with a slope gradient by controlling a transfer torque capacity of the starting clutch.

BACKGROUND

As the driving force control system for a vehicle such as described above, an example technique is disclosed in Japanese Laid-Open Patent Application Publication No. 2009-132195.

This driving force control system may be propelled by a drive or propulsion source other than the engine such as an electric motor. In particular, the technique is particularly applicable to a hybrid vehicle in which a first clutch capable of varying a transfer torque capacity is interposed between the engine and the drive wheels and a second clutch capable of varying a transfer torque capacity is interposed between the electric motor and the drive wheels. This is detailed below.

In accordance with a uphill or the temperature of the second clutch, the engine is allowed to rotate autonomously with the first clutch released and, by holding the motor rotation speed of the electric motor below the engine rotation speed, the driving force is realized or transferred with the second clutch being under a slip control, thereby suppressing the heat generation of the second clutch.

However, in the drive control system for a vehicle described above, the following problem arises. Specifically, in an extremely low speed region where an output rotation sensor is not able to detect the output shaft rotation speed necessary for suppressing the heat generation by the second clutch, in view of the importance to suppress the heat generation, the input rotation speed has been decreased to a region where the slip rotation of the second clutch cannot be detected while feed-forward controlling the second clutch.

Incidentally, with respect to the second clutch, since a difference may occur between a hydraulic pressure command value controlling the torque capacity thereof and an actual pressure, or the properties of the friction member of the second clutch per se change over time and undergoes aging, the control characteristic does not remain the same.

Therefore, the actual torque capacity representing the control result of the second clutch does not match the target torque capacity as a control command. The difference or deviation in both may create a difference of torque capacity.

With the conventional technique, in an extremely low speed region where an output rotation sensor is not able to detect the output shaft rotation speed necessary for suppressing the heat generation by the second clutch, in view of the importance to suppress the heat generation, the input rotation speed has been decreased to a region where the slip rotation of the second clutch cannot be detected while feed-forward controlling the second clutch.

During this feed-forward control, when the second clutch produces the deviation in torque capacity, then the driver is not in a position to achieve the desired, target driving force so that the problem of deterioration in drivability of the hybrid vehicle will arise.

On the other hand, however, despite the situation in which the output shaft rotation speed necessary for suppressing heat generated by the second clutch in the extremely low speed is not detectable by the output rotation sensor, if a driving force control is continued based on the false detection of the output rotation sensor, the calculated value of the slip rotation of the second clutch is also false so that the heat generation of the second clutch may not be suppressed as desired. On the contrary, such control would lead to promoting the heat generation. At any rate, it has been conventionally difficult to compromise the heat generation suppression of the second clutch for the vehicle drivability.

BRIEF SUMMARY

The present invention, though not necessarily applicable only to the hybrid vehicle described above, has been made in order to solve the problem above and to provide a driving force control system for a vehicle by controlling a drive source so as to change or switch a target input side rotation speed of the starting clutch such as the second clutch, thereby enabling to compromise the heat generation suppression of the clutch for vehicle drivability.

In order to meet the object, the driving force control system for a vehicle according to the present invention is configured in the following manner. First, the present invention is assumed to be applied to a vehicle including a starting clutch in a power transmission line or system between a drive source and drive wheels and the driving force is controllable by a transfer torque capacity control of the starting clutch.

The driving force control system to be applicable to such a vehicle is characterized by the configuration including a target driving force calculation unit, a road surface gradient detection unit and a drive source control unit, as will be detailed below.

First, the target driving force calculation unit is intended to calculate a target driving force of the vehicle based on driving or operation conditions while the road surface gradient detection unit detects a road surface gradient during travel of the vehicle.

Further, the driving force control unit drivingly controls the driving force such that the target input side rotation speed of the starting clutch assumes a value defined to be achieved which is set at a rotation speed higher than the target input rotation speed of the starting clutch in the case in which the target driving force is less than the driving force by which the vehicle can climb the gradient being traveled, and by which a slip rotation represented by the difference thereof over the output side rotation speed can be detected even during travel at low vehicle speed, when the target driving force calculated by the target driving force calculation unit indicates the driving force by which the vehicle can climb on a road surface gradient during the driving force control of the starting clutch by the transfer torque capacity control, based on the signals from these road surface gradient detection unit and a drive source control unit.

According to the driving force control system in the present invention described above, when the target driving force indicates the driving force with which the vehicle can climb the road gradient, the driving force will be drivingly controlled such that the target input side rotation speed of the starting clutch assumes such a value defined to be achieved which is set at a rotation speed higher than the target input rotation speed of the starting clutch in the case in which the target driving force is less than the driving force by which the vehicle can climb the gradient being traveled, and by which a slip rotation represented by the difference thereof over the output side rotation speed can be detected even during travel at low vehicle speed, when the target driving force indicates the driving force by which the vehicle can climb on a road surface gradient during the driving force control of the starting clutch by the transfer torque capacity control.

Therefore, the following operational effects may be derivable. Specifically, when the driver desires to start the vehicle by driving force, and thus the target driving force representing the driving force allowing to climb the road gradient, a normative driving force control is possible based on a slip rotation of the starting clutch, which is detectable accurately so that the control will be performed in line with the driver's demand with emphasis placed on drivability.

On the other hand, when, due to lack of driver's demand to start by driving force, the target driving force is not sufficient to climb the road gradient, thus the driving force control described above will be refrained from being carried out. Therefore, the slip rotation of the starting clutch remains low so that the heat generation of the clutch may be prevented from being increased. Therefore, in lieu of the drivability the driver does not desire, more emphasis is placed on the control that suppresses the heat generation of the starting clutch.

Consequently, in the driving force control system for a vehicle according to the present invention, by controlling the driving force source so as to change the target input side rotation speed of the starting clutch in response to the start/stop of the vehicle, both the drivability required at the vehicle start up and the heat generation suppression required of the staring clutch during the vehicle stop may be satisfied.

BRIEF DESCRIPTION OF DRAWINGS

The description herein makes reference to the accompanying drawings wherein like reference numerals refer to like parts throughout the several views, and wherein:

FIG. 3 is a functional block diagram of the integrated controller in the control system shown in FIG. 2.

FIG. 5 is an explanatory diagram of the states of the power train in each drive mode of the hybrid vehicle shown in FIGS. 1 to 4.

FIG. 10 illustrates the operational state of the embodiment shown in FIGS. 1 to 8, and thus showing an operation timing chart at the starting time where the target drive torque is equal to or below the gradient associated load.

DETAILED DESCRIPTION OF THE EMBODIMENTS

An embodiment according to the present invention is now described with reference to the accompanying drawings.

Figure 1:
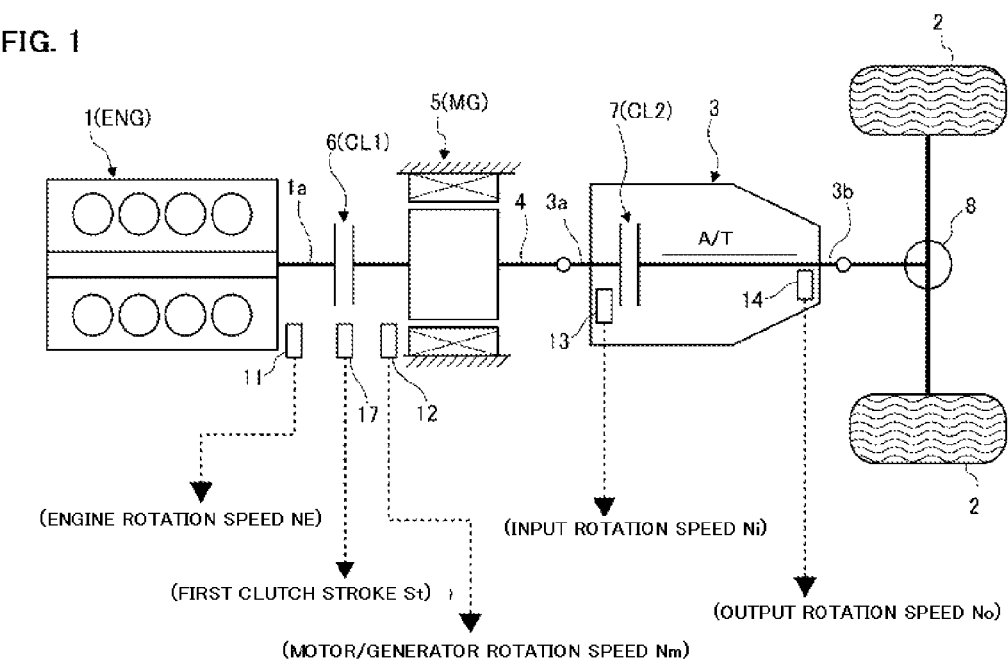
FIG. 1 is a schematic plane diagram illustrating a power train for a hybrid vehicle to which the drive control system according to the present invention is applicable.

FIG. 1 illustrates a power train for a hybrid vehicle to which the driving force control system is applicable. This hybrid vehicle is obtained by doing alterations on a conventional front engine, rear wheel drive vehicle (FR drive vehicle) as a base platform to obtain a hybrid configuration. In FIG. 1, reference sign 1 denotes an engine as drive or power source, and reference sign 2 denotes drive wheels (rear wheels).

In the power train shown in FIG. 1, as in the conventional rear wheel drive vehicle, an automatic transmission is disposed rearward of engine 1 in the vehicle longitudinal direction in a tandem arrangement. A motor/generator 5 is coupled in a shaft 4 that transfers the rotation from engine 1 (crankshaft 1a) to an input shaft 3 of the automatic transmission 3. This motor/generator 5 is provided as a second power source and corresponds to a power source according to the present invention.

Motor/generator 5 functions as an electric motor (electrically driven motor) as well as a generator (electric generator) and is disposed between engine 1 and automatic transmission 3. A first clutch 6 is interposed between this motor/generator 5 and engine 1, more specifically, between shaft 4 and engine crank shaft 1a so that engine 1 is selectively disengaged or released from motor/generator 5. Note that the first clutch 6 may change its transfer torque capacity either continuously or stepwise, and may be configured by a wet multiple-plate clutch that can change the transfer torque capacity by controlling a clutch applied hydraulic flow rate or clutch applied hydraulic pressure either continuously or stepwise by using a linear solenoid valve.

A second clutch 7 that corresponds to a starting clutch in the present invention is interposed between motor/generator 5 and drive wheels (rear wheels) 2 and motor/generator 5 is coupled to drive wheels (rear wheels) selectively disengaged by this second clutch 2. The second clutch 7 is configured, similarly in the first clutch 6, may change its transfer torque capacity either continuously or stepwise, and may be configured by a wet multiple-plate clutch that can change the transfer torque capacity by controlling a clutch applied hydraulic flow rate or clutch applied hydraulic pressure either continuously or stepwise by using a linear solenoid valve.

An automatic transmission 3 may be formed in an arbitrary manner, and determines a power transfer path (transmission or speed ratio) by selectively engaging or disengaging a plurality of transmission friction elements (clutch, brake, etc.) to form a combination of engagement/disengagements of these transmission friction elements.

Therefore, automatic transmission 3 outputs the rotation from input shaft 3a by changing through a gear ratio in accordance with a speed or transmission ratio selected. This output rotation is further distributed and transferred to left and right wheels 2 through differential gear device 8 to propel the vehicle. Note that the automatic transmission 3 is not limited to the step type described above, but may be formed in a continuous transmission, as well.

Incidentally, in FIG. 1, the second clutch 7 that may be selectively connected between motor/generator 5 and drive wheel 2 is not additionally provided as a dedicated component, but a transmission friction element provided in the automatic transmission 3 is selected for common use.

In this case, the second clutch 7 not only functions as the transmission step selection function (transmission function) to cause automatic transmission 3 in a driving power transmissible state, but also performs a mode selection function described below through cooperative operation to release/engage from/with the first clutch 6 so that the cost for the dedicated second clutch may be avoided and is advantageous in cost.

However, it goes without saying that the second clutch 7 is formed in a dedicated component. In this case, second clutch 7 is interposed between input shaft 3a of automatic transmission 3 and motor/generator shaft 4, or between output shaft 3b of automatic transmission 3 and rear wheel drive system.

In the power train for a hybrid vehicle shown in FIG. 1 above, when an electrically drive (EV) mode is demanded during a low load, low vehicle speed state including a startup operation from the vehicle stopped state, the first clutch 6 is released and the second clutch 7 is engaged to allow the automatic transmission 3 in a power transmission state. Note that the second clutch represents a transmission friction element to be engaged in a current transmission step or ratio out of transmission friction elements within automatic transmission 3 so that it varies depending on the transmission step being selected.

When driving the motor/generator 5 from this state, only the output rotation from the motor/generator 5 reaches input shaft 3a of transmission so that the automatic transmission 3 outputs the rotation into the input shaft 3a by transmitting depending on the transmission step being selected through transmission output shaft 3b.

The rotation from the transmission output shaft 3b reaches thereafter drive wheels 2 via differential gear device 8 to drive the vehicle by the motor/generator 5 only in an electrically drive (EV) mode.

When a hybrid drive or running (HEV) mode is demanded during a high vehicle speed travel, at high load travel, and the like, while holding the automatic transmission 3 in a transmission step selection state by engagement of second clutch 7 (power transmission state), the first clutch 6 will be engaged as well.

In this state, both the output rotation from engine 1 and the output rotation from motor/generator 5 reach the transmission input shaft 3a so that automatic transmission 3 causes to transmit the rotation into input shaft 3a after a speed change in accordance with the transmission or speed step being selected to output from the transmission output shaft 3b.

The rotation from transmission output shaft 3b reaches thereafter rear wheels 2 via differential gear device 8 to enable to drive the vehicle by both engine 1 and motor/generator 5 in a hybrid drive (HEV) mode.

When, during running in accordance with the HEV mode, a surplus of energy occurs while being operated at optimum fuel efficiency of the engine 1, this excess energy is converted into electric power to operate motor/generator 5 as a generator. It is possible to improve the fuel efficiency of the engine 1 by storing this power for motor drive of the motor/generator 5.

Figure 2:
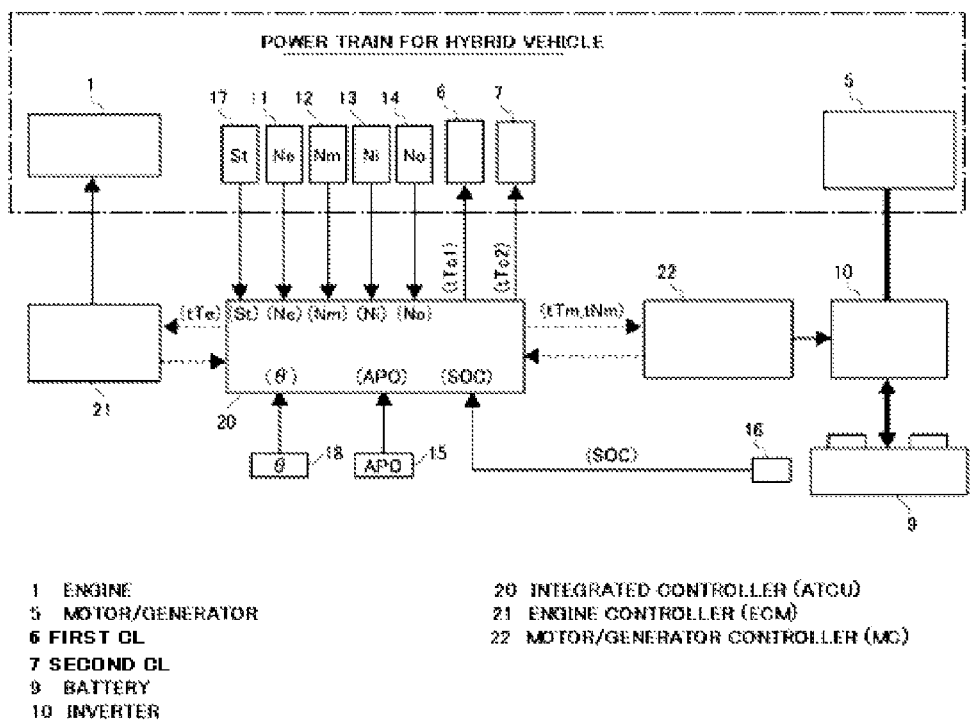
FIG. 2 is a block diagram illustrating a control system for the power train illustrated in FIG. 1.

Engine 1, motor/generator 5, first clutch 6, and second clutch 7 each constituting a power train of the hybrid vehicle shown in FIG. 1 is controlled by the system shown in FIG. 2. The control system shown in FIG. 2 includes an integrated controller 20 for integrally controlling an operation point of the power train. Specifically, the operation point is defined by a target engine torque tTe, a target motor/generator torque tTm and a target motor/generator rotation speed tNm, a target transfer torque capacity tTc1 of first clutch 6, and a target transfer torque capacity tTc2 of a second clutch 7.

Integrated controller receives, to determine the operation point of the power train described above:

a signal from an engine rotation sensor 11 to detect a motor rotation speed Nm;

a signal from a motor/generator rotation sensor 12 to detect a motor/generator rotation speed Nm;

a signal from an input rotation sensor 13 to detect a transmission input rotation speed Ni;

a signal from an output rotation sensor 14 to detect a transmission output rotation speed No;

a signal from an accelerator opening degree sensor 15 to detect an accelerator pedal depression amount (accelerator opening AP0) indicative of demanding torque to vehicle;

a signal from a charging state sensor 16 to detect a charging state SOC (dischargeable power) of battery 9 to charge the power for motor/generator 5;

a signal from a clutch stroke sensor 17 to detect a stroke St of the first clutch 6, and a signal from a road gradient sensor 18 (G sensor, for example) to detect a road surface gradient θ.

Note that, out of the sensors described above, engine rotation sensor 11, motor/generator rotation sensor 12, input rotation sensor 13, output rotation sensor 14, and clutch stroke sensor 17 may be disposed as illustrated in FIG. 1.

The integrated controller 20, based on accelerator opening degree APO, battery charging state SOC, and transmission output rotation speed No (vehicle speed VSP) out of the input information described above, selects a drive mode (EV mode, HEV mode) that may achieve the vehicle driving force of driver's request. In addition, integrated controller 20 calculates a target engine torque tTe, a target motor/generator torque tTm, a target motor/generator rotation speed tNm, a target first clutch transfer torque capacity tTc1, and a target second clutch transfer torque capacity tTc2, respectively.

The target engine torque tTe is furnished to engine controller 21, while the target motor/generator torque tTm and a target motor/generator rotation speed tNm are furnished to motor/generator controller 22, respectively.

Engine controller 21 controls engine 1 to cause engine torque Te to achieve the target engine torque tTe, while motor/generator controller 22 controls motor/generator 5 via both battery 9 and inverter 10 to cause torque Tm and rotation speed Nm of motor/generator 5 to achieve the target motor/generator torque tTm and the target motor/generator rotation speed tNm.

The integrated controller 20 furnishes solenoid currents corresponding to the target first clutch transfer torque capacity tTc1 and the target second clutch transfer torque capacity tTc2 to engagement control solenoids (not shown) associated with the first clutch 6 and the second clutch 7 to thereby to separately control to cause the transfer torque capacity Tc1 of first clutch 6 to match the target transfer torque capacity tTc1 while to cause the transfer torque capacity tTc2 of second clutch 7 to match the target transfer torque capacity tTc2.

Figure 4:
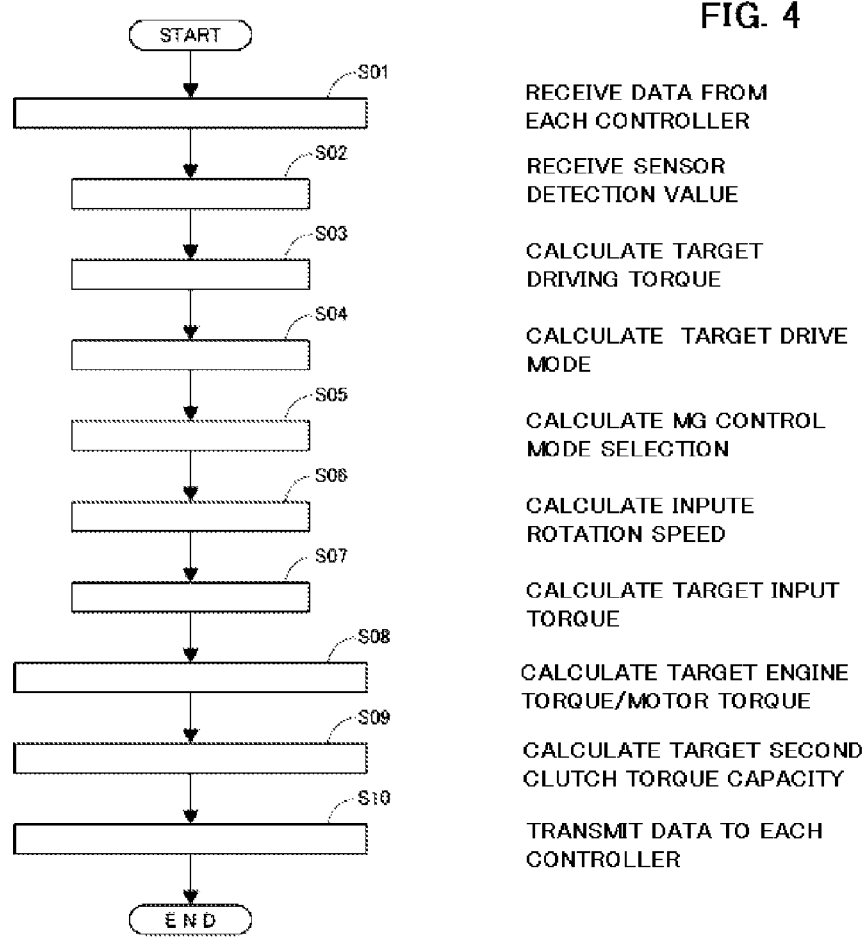
FIG. 4 is a flowchart showing the main routine of the power train control including the driving force control in one embodiment according to the present invention to be executed by the integrated controller shown in FIG. 3.

The integrated controller 20 is configured such as illustrated in the functional block diagram shown in FIG. 3, and executes various controls in accordance with the control program shown in FIG. 4 such as the selection of running or drive mode (EV mode, HEV mode), calculations of a target engine torque tTe, a target motor/generator torque tTm, a target motor/generator rotation speed tNm, a target first clutch transfer torque capacity tTc1, and a target second clutch transfer torque capacity tTc2, together with a driving force control in accordance with a gradient load to which the present invention is purported.

In FIG. 4, in step S01, data is received from engine controller 21 and motor/generator controller 22, and, in step S02, detection values of each sensor 11 to 18 will be input.

Subsequently, in step S03 (target drive torque calculation section 31), based on a vehicle speed VSP calculated in vehicle speed calculation section 32 and accelerator opening degree APO (braking operation force at the time of braking), with reference to a predetermined target driving force map, the target driving force is calculated demanded by the driver though his or her driving operation. Therefore, step 03 (target driving force calculation section) corresponds to the target driving force calculation unit.

In the subsequent step S04 (target drive mode calculation section 33), based on the target drive torque, battery charging rate SOC, accelerator opening APO, vehicle speed VSP and the like, using the predetermined target drive mode region map, the drive mode targeted is calculated.

As running or drive modes, as shown in FIG. 5, in addition to the electrically driven (EV) mode and hybrid drive (HEV) mode described above, between these EV and HEV modes, a gradient load corresponding driving force control mode (MWSC mode) based on the gradient load and a transition drive (WSC) mode during the transitional phase between the EV mode and HEV mode are set.

In the EV mode, with the engine 1 being held stopped, the first clutch 6 (CL1) is released and the second clutch 7 (CL2) is either engaged or in a slip engagement to allow the automatic transmission 3 to assume a corresponding transmission step or ratio selection state (power transmission state) to thereby transfer the output rotation of motor/generator 5 only to the rear wheels 2 during a shifting operation.

In the HEV mode, with the second clutch 7 (CL2) being held engaged to hold the automatic transmission at the corresponding transmission ratio selection state (power transmission state), the first clutch 6 (CL1) is held engaged as well so that both the output rotation of engine that has been in a started state and the output rotation of motor/generator under torque control are transferred to rear wheels 2 under a shifting operation by automatic transmission 3.

When transitioning from the EV mode to the HEV mode, as shown in the transitional drive (WSC: Wet Start Clutch) mode, while holding the automatic transmission 3 in a corresponding speed ratio selection state (power transmission state) by a slip engagement of the second clutch 7 (CL2), engine 1 will be started through engagement of the first clutch 6 (CL1) and the rotation control of motor/generator 5 (MG) to switch over to the HEV mode.

The gradient load responsive or corresponding driving force control mode (MWSC: Motor Wet Start Clutch), as detailed below, is selected during a vehicle stopped state without involving driver's intention to start or at the vehicle start up. Specifically, during the vehicle stop, as shown in FIG. 5, the input side rotation speed of the second clutch 7 (CL2) is held to be restricted low so that a heat generation suppressing control is emphasized to reduce the difference in rotation. While at the startup of the vehicle, by allowing the input side rotation speed of the second clutch 7 (CL2) to increase to a value which would enable to detect the rotational difference of CL2 so that a drivability emphasis mode will be achieved by imparting precisely the driving force in response to the starting operation.

In step S05 (MG control mode selection section 34) in accordance with the target drive mode determined in step S04 (target drive mode calculation section 33), as shown in FIG. 5, a rotation speed control is selected as a motor control mode of motor/generator 5 (MG) when the EV mode is being selected as the target drive mode, a rotation speed control is selected as the motor control mode of motor/generator 5 (MG) when the WSC mode is being selected as the target drive mode, and a torque control is selected as the motor control mode of motor/ generator 5 (MG) when the HEV mode is being selected as the target drive mode.

Figure 6:
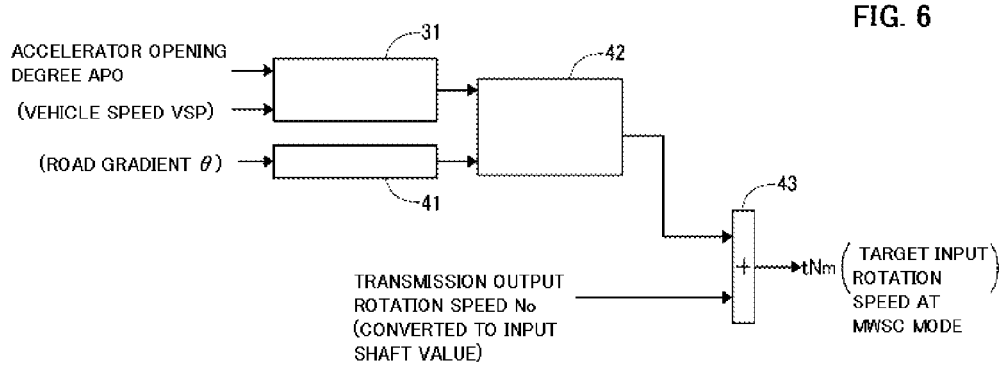
FIG. 6 is a functional block diagram illustrating a calculation procedure of the target input rotation speed when the drive mode of the hybrid vehicle shown in FIGS. 1 to 4 is MWSC mode.

In step S06 (target input rotation speed calculation section 35), in accordance with the target drive mode and motor (MG) control mode determined in step S04 (target drive mode calculation section 33) and step S05 (MG control mode selection section 34), respectively, a target input rotation speed (target motor rotation speed tNm) is obtained. However, the determination of the target input rotation speed (target motor rotation speed tNm) in the modes other than the MWSC mode may is not relevant to the present invention but may be obtained in a usual manner. Therefore, only the calculation procedure that relates to the target input rotation speed (target motor rotation tNm) in the MWSC mode will now be described below with reference to FIG. 6.

In a gradient load calculation section 41, based on the road gradient θ, a gradient load exerted on the vehicle associated with this gradient θ is calculated.

In a target second clutch slip rotation calculation section 42, a comparison is made between the gradient load obtained in the calculation section 41 and the target drive torque obtained in the target drive torque calculation section 31 in magnitude, and depending on the calculation result, a target second clutch slip rotation speed is calculated. Then, in an adder 43, by adding the target second clutch slip rotation speed to an input shaft conversion value converted from the transmission output rotation speed No, the target input rotation speed tNm of the second clutch 7 (CL2) may be obtained in the MWSC mode.

Note that in the target second clutch slip rotation calculation section 42, when the target drive torque exceeds the gradient load thus indicating a startup operation, the target second clutch rotation speed is set such that the lower limit of the target input rotation speed tNm of second clutch 7 (CL2) is set above the region in which the slip rotation of the second clutch representing the difference in rotation over the output side rotation speed No.

In addition, in the target second clutch slip rotation speed calculation section 42, when the target drive torque is equal to or less than the gradient load indicating the vehicle stopped state without driver's intention to start, the target second clutch slip rotation speed will be set such that the upper limit of the target input rotation speed tNm of second clutch 7 (CL2) is below the region in which the detection of the second clutch slip rotation indicative of the rotation difference over the output side rotation speed No is disabled.

Stated another way, during the vehicle stopped state with the target drive torque being equal to the gradient load or less, the target second clutch slip rotation speed calculation section 42 set the target second clutch slip rotation such that the upper limit of the target second clutch 7(CL2) input rotation speed tNm will be set so that a surplus or excessive current to increase the slip heat generation of the second clutch 7 (CL2) will not be furnished to motor/generator 5(MG).

The target second clutch slip rotation speed obtained by the target second clutch slip rotation speed calculation section 42 in the manner described above will be used to control the motor/generator 5 as apparent from the description below. Therefore, the target second clutch slip rotation speed calculation section 42 corresponds to the drive source control unit or mechanism according to the present invention.

In step S07 (target input torque calculation section 36), considering the protection of various devices, a target input torque to achieve the target drive torque obtained in step S03 (target drive torque calculation section 31).

In step S08 (target engine torque/target motor torque calculation section 37), the target input torque calculated in step S07 (target input torque calculation section 36), and the power generation demand by motor/generator 5 are taken into consideration, and a torque distribution to engine 1 and motor/generator 5 will be decided, and, based on this distribution, both a target engine torque tTe and a target motor torque tTm will be calculated. Note that, as described above, since the first clutch 6 (CL1) is in a released or disengaged state in the MMSC mode, the target motor torque tTm is the same as the target input torque calculated in step S07 (target input torque calculation section 36).

Figure 7:
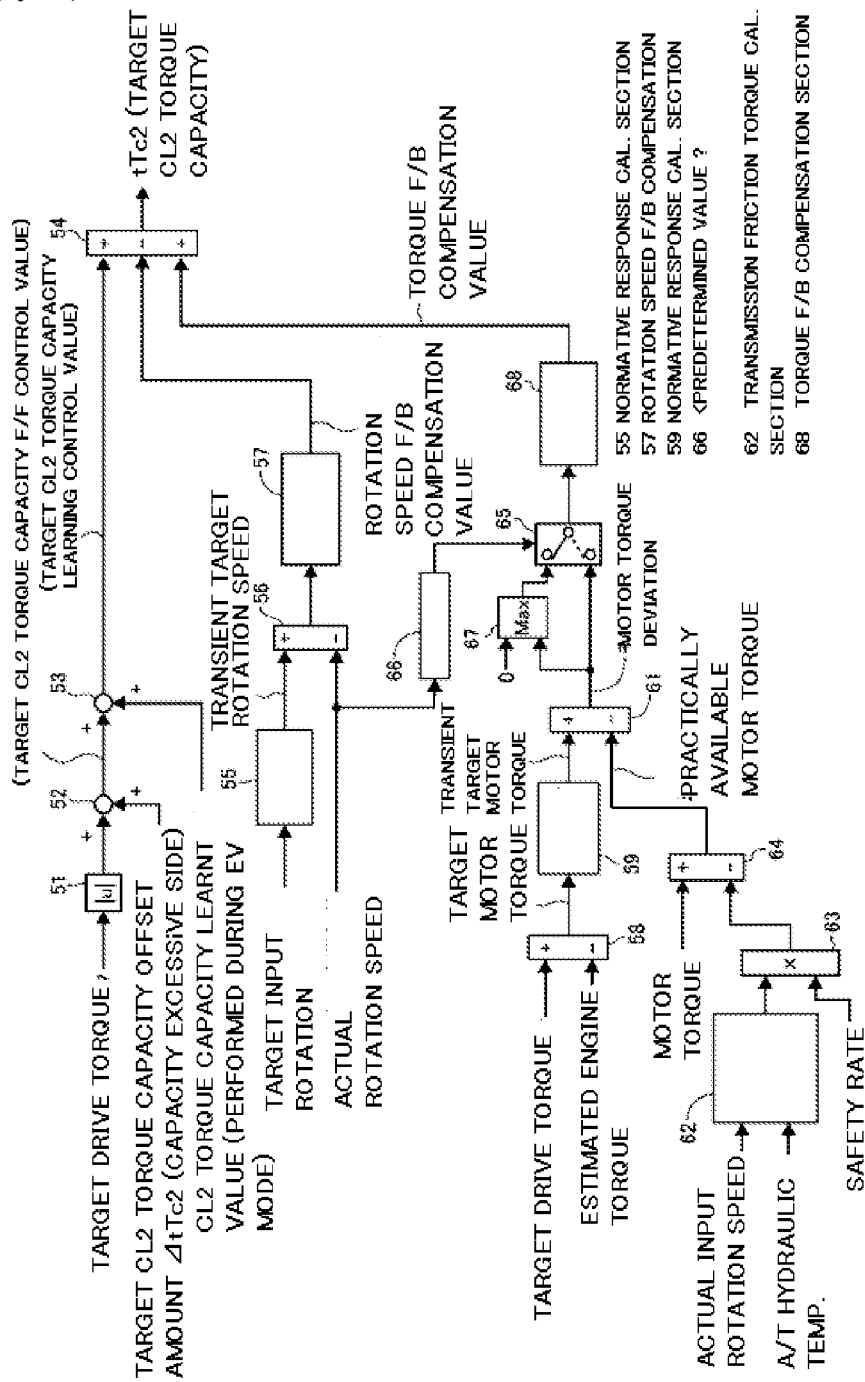
FIG. 7 is a functional block diagram illustrating a calculation procedure of the target torque capacity of the second clutch of the hybrid vehicle shown in FIGS. 1 to 4.

In step S09 (target second clutch torque capacity calculation section 38), when the MWSC mode is selected in step S04 (target drive mode calculation section 33), the target second clutch capacity tTc2 will be obtained in the manner shown in FIG. 7 to set the target drive torque. However, this target second clutch torque capacity tTc2 will be corrected using the motor torque at the time of the rotation speed control.

Thus, as shown in FIG. 7, the absolute value of the target drive torque is obtained in a calculation section 51, and by adding to the absolute value of the target drive torque an offset amount on the excessive capacity side of the target second clutch torque capacity tTc2, a target feed-forward (F/F) control value of the second clutch torque capacity will be obtained.

Figure 8:
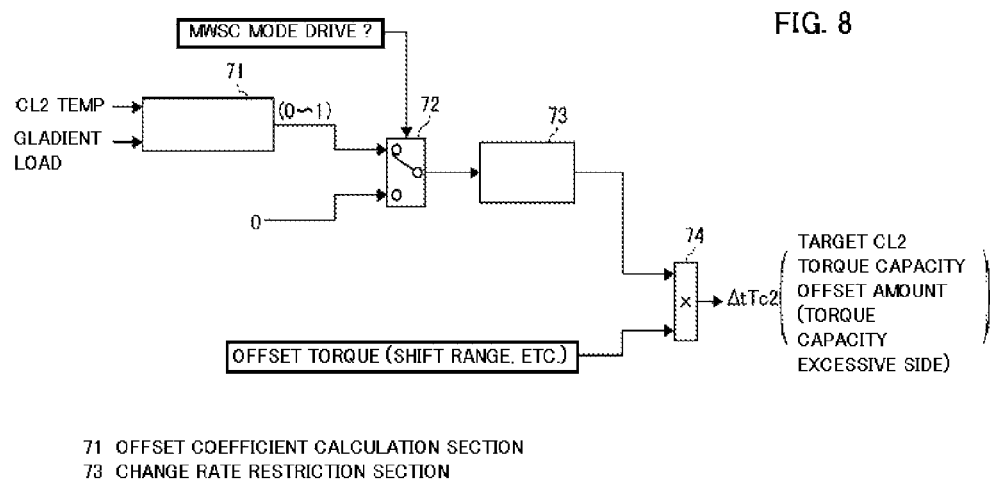
FIG. 8 is a functional block diagram illustrating a procedure for obtaining an offset amount of the target second clutch torque capacity for use in the target second clutch torque capacity calculation process in FIG. 7.

The offset amount ΔtTc2 on the excessive capacity side of the target second clutch torque capacity tTc2 is obtained in the manner shown in FIG. 8. In an offset coefficient calculation section 71, an offset coefficient (between 0 and 1) is obtained based on the temperature of second clutch 7 (CL2) and the gradient load. A switching unit 72 outputs a signal from a contact to which the offset coefficient of "zero" constantly is furnished unless the MWSC mode is in place. In the MWSC mod drive, the signal from a contact to which the above described offset coefficient (between zero and 1") will be output.

In a changing rate limiter 73, the changing rate of the offset coefficient from the switching unit 72 is restricted so as not to change at a rate more than a predetermined rate of change.

In a multiplier 74, by multiplying the offset torque determined for each shift range by the offset coefficient which was applied with the rate change restriction described above to obtain the offset amount ΔtTc2 on the capacity excessive side of the target second clutch torque capacity tTc2.

Incidentally, in the mode other than the MWSC mode, the offset amount ΔtTc2 is "0" due to the offset coefficient being "0" held by the switching unit 72. However, in the MWSC mode, since switching unit 72 outputs an offset coefficient between "0" and "1" to serve to the calculation of the offset amount ΔtTc2, an offset amount ΔtTc2 may be obtained for offsetting the target second clutch torque capacity tTc2 to the capacity excessive side. This offset amount ΔtTc2 on the capacity excessive side of the target second clutch torque capacity tTc2 is intended to prevent the vehicle from sliding down on the gradient by ensuring a torque capacity to fully resist the gradient load without the second clutch 2 (CL2) being released due to variations or aging with respect to the control characteristic of the second clutch 7 (CL2).

Note that the feed-forward (F/F) control value of the target second clutch torque capacity was obtained in FIG. 7 by adding in adder 52 the absolute value of the target drive torque and the offset amount ΔtTc2 on the capacity excessive side of the target second clutch torque capacity tTc2. However, irrespective the drive or running mode, the adder 52 may be omitted by setting to increase the target drive torque by ΔtTc2 on the capacity excessive side.

In the adder 53 shown in FIG. 7, the target second clutch capacity feedback (F/B) control value is obtained by adding to the target second clutch torque capacity feed-forward (F/F) control value a second clutch torque capacity learnt value obtained in the EV mode, and this target second clutch torque capacity feedback (F/B) control value is input to the add/subtracting unit 54.

In the normative response calculation section 55, a real time transient target input rotation speed necessary to achieve the target input rotation speed at a predetermined responsiveness while in the subtracter 56, by subtracting a real or an actual input rotation speed from the transitional target input rotation speed to obtain a deviation between these.

In a rotation speed feedback (F/B) compensator 57, a rotation speed F/B compensating amount of the target second clutch torque capacity tTc2 necessary to disappear the input rotation deviation described above and to bring the actual input rotation speed to match the transitional target input rotation speed described above for inputting this rotation speed F/B compensating amount to the adder/subtracter 54.

In the subtracter 58, a target motor torque is obtained by subtracting an estimated engine torque from the target drive torque, and in normative response calculation section 59, a real-time transient target motor torque is obtained to achieve this target motor torque at the predetermined normative response for inputting to subtracter 61.

In a transmission friction calculation section 62, a frictional torque in the automatic transmission 3 is obtained based on the actual input rotation speed and a temperature of the transmission operating oil, and multiplying this transmission friction torque by a safety rate in multiplier 63 to obtain a transmission frictional torque margin or allowance.

In the subtracter 64, by subtracting from the motor torque the transmission frictional torque margin to calculate a practical motor torque and input this practical motor torque to subtracter 61.

In the subtracter 61, by subtracting the practical motor torque obtained in the subtracter 64 from the transient target motor torque obtained in the normative response calculation section 59 to calculate a motor torque deviation (overages and shortage) of the practical motor torque with respect to the transient target motor torque. This motor torque deviation will be assume "0" when one-way clutch is in a disengaged (released) state while the automatic transmission 3 is placed in a transmission or speed ratio of power transmission.

The switching unit 65 is configured to be positioned in the solid position when the second clutch slip rotation speed detection enabling determiner 66 determines that the actual input rotation speed is less than a predetermined value for detecting the second clutch slip rotation detection enabling region (second clutch slip rotation may not detected). When the second clutch slip rotation detection enabling determinater 66 determines the actual input rotation speed is equal to or greater than the predetermined value (second clutch slip rotation is detectable), the switching unit 65 is in the broken position.

A motor torque deviation switching unit 65 outputs a motor torque deviation from the subtracter 61 when in the broken line position) when the second clutch slip rotation is detectable), while, in the solid line position (the second clutch slip rotation is not detectable), outputs the greater one of the motor torque deviation from subtracter 61 selected by the select-high selector 67 and a motor torque deviation (=0).

In a torque feedback (F/B) compensator 68, a torque F/B compensating amount of the target second clutch torque capacity tTc2 necessary to achieve the transient target motor torque by deleting the motor torque deviation output from the switching unit 65 to input this torque F/B compensating amount to the adder/subtracter 54.

The adder/subtracter 54 in turn subtracts from the target second clutch torque capacity leant value obtained by the adder 53 the rotation speed R/B compensating amount obtained by the rotation speed feedback compensator 57, and adding the torque F/B compensating amount obtained by the torque feedback compensator 68, to calculate the target second clutch capacity tTc2 as the final feedback control value.

As has been described with reference to FIGS. 7 and 8, the target second clutch torque capacity tTc2 performs the correction based on the motor torque in the following manner: Specifically, during a period in which the automatic transmission 3 is placed in a transmission or speed ratio via one-way clutch,
(1) When the input rotation speed is within a region in which the slip rotation of the second clutch 7 (CL2) is detectable, since the switching unit 65 is place in the broken line position to output the motor torque deviation from the subtracter 61;
  (1)-1 At the one-way clutch being in the engaged (connected) state, when the practically available motor torque of the motor/generator (electric motor) 5 obtained in subtracter 64 is less than a transient target motor torque of the motor/generator (electric motor) 5 obtained in calculation section 59, upon the motor torque deviation between these obtained in subtracter 61 being positive value, an increasing correction is implemented, while, when the practically available motor torque is equal to or greater than the target motor torque, upon the motor torque deviation being negative a decreasing correction is implemented so that both the increasing correction and decreasing are implemented to correct the second clutch target transfer torque capacity tTc2 by motor torque are implemented,
  (1)-2 At the one-way clutch being in the disengaged (disconnected) state, by having the motor torque deviation from subtracter 61 to be "0", the correction of the second clutch target transfer torque capacity tTc2 by motor torque will be prevented.

Similarly, during a period in which the automatic transmission 3 is placed in a transmission or speed ratio via one-way clutch,
(2) When the second clutch 7 (CL2) is in an input rotation region in which a slip rotation of the second clutch 7 (CL2) is not detectable or in undetectable region (engagement or release of one-way clutch is not detectable), the switching unit 65 is placed in the solid position to output the selection result of the select-high selecting unit 67, i.e., the larger one of the motor torque deviation and the motor toque deviation (=0). Therefore, by detecting the release of the one-way clutch by motor torque and a decreasing correction by the select-high selection as the correction or corrective measure of the second clutch target transfer torque capacity.

On the other hand, when the automatic transmission 3 is placed in the transmission step or ratio which is irrelevant from the one-way clutch,
(1) When the second clutch 7 (CL2) is in an input rotation region in which the slip ration may be detected, the switching unit 55 is placed in the broken position to output the motor torque deviation from the subtracter 61, both the increasing and decreasing corrections are implemented as correction of the second clutch target transfer torque capacity tTc2 by motor torque,
(2) When the second clutch 7 (CL2) is placed in the input rotation region in which the slip rotation of the second clutch 7 (CL2) may not detected, the switching unit 65 is placed in the solid line to output the selecting operation of the select-high selector 67, i.e. larger one of the motor torque deviation from the subtracter 61 and the motor torque deviation (=0). Therefore, since the polarity of the slip rotation of the second clutch 7 (CL2) is unknown, irrespective of the polarity of the slip rotation, only a decreasing correction by way of the select-high selection described above is carried out as the correction or corrective measure of the second clutch target transfer torque capacity tTc2 by motor torque.

Moreover, the correction of the second clutch target transfer torque capacity tTc2 by motor torque is directed to correct the second clutch target transmission torque capacity tTc2 in a decreasing direction only in the input rotation speed region in which the slip rotation of the second clutch 7 (C2) is not detectable. However, since the adder 52 adds to the absolute value of the target drive torque the offset amount ΔtTc2 on the capacity excessive side of the target second clutch torque capacity tTc2, this capacity excessive amount will be corrected to be decreased, so that the variations in the second clutch 7 (CL2) may be corrected reliably even in a situation in which the slip state of the second clutch 7 (CL2) or the engagement/release of the one-way clutch may not detected.

In addition, in the correction of the second clutch target transfer torque capacity tTc2 by the motor torque, since a practical motor torque is achieved by subtracting a transmission friction portion including a viscosity resistance in accordance with oil temperature for use in the correction of the second clutch target transfer torque capacity, in the case in which, despite the target rotation speed being coincident with the actual rotation speed and thus the second clutch torque capacity being "0", the motor torque will not be reduced to "0" actually, the control reflecting this situation may be possible.

Note that, although omitted in the drawings because of direct relevance to the present invention, the target first clutch torque capacity tTc1 of the first clutch 6 (CL1) is calculated in a conventional manner depending on the vehicle operating states, an engine rotation speed, and the like.

In step S10 in FIG. 4, the various calculation results tTe, tTm, tNm, tTc1, and tTc2 are transmitted respectively as shown in FIGS. 2 and 3.

According to the driving force control system for a vehicle in the embodiment describe above, when the target drive torque exceeds a gradient load, i.e., when the driver wishes to start and the target driving force indicates the driving force to climb the road surface gradient, the target motor rotation speed tNm representing a target input rotation speed to the second clutch 7 (CL2) is set to a lowest value at which detection of the slip rotation over the output side rotation No may be detected and the motor/generator 5 is controlled to achieve the target motor rotation speed tNm the lower limit of which has been set.

Further, when the target drive torque is equal to or less than the gradient load, i.e., when the drive does not demand to start and the target driving force does not represent the driving force to climb or grade the road gradient, then the upper limit value of the target motor rotation speed tNm representing the target input side rotation speed of the second clutch 7 (CL2) is set to the motor rotation speed (input rotation speed) with which excessive current would not be supplied to motor/ generator 5 so that the motor/generator 5 may be controlled to achieve the target motor rotation speed tNm the upper limit of which has been set. Therefore, the operational effects below may be achieved.

Figure 9:
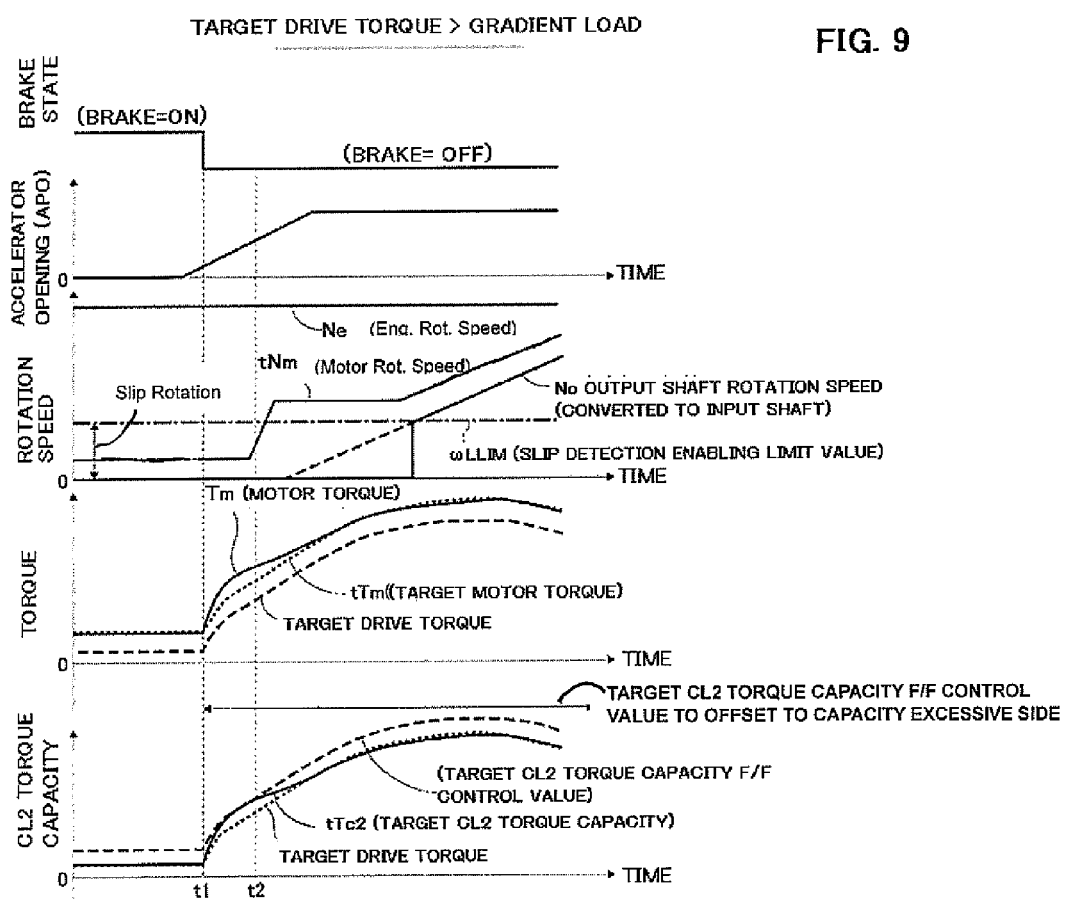
FIG. 9 illustrates the operational state of the embodiment shown in FIGS. 1 to 8, thus showing an operation timing chart at the starting time where the target drive torque exceeds the gradient associated load.

Specifically, when description is made for an example in which in response to the brake being OFF and accelerator pedal Apo being larger than "0" at instant t1 in FIG. 9, the target drive torque exceeds the gradient load at instant t2. The lower limit of the target input side rotation speed (target motor rotation speed tNm) of the second clutch 7 (CL2) is set greater than a slip detection enabling limit value ωLLIM at which a slip rotation indicating the difference over the output rotation speed No is detectable and control of motor/generator 9 is performed to achieve this.

Due to this lower limit setting of the target input side rotation speed (target motor rotation speed tNm), the slip rotation of the second clutch 7 (CL2) may be detected reliably, and the ordinary, gradient load corresponding driving force control is enabled based on the detected, accurate slip rotation so that control with emphasis on drivability in accordance with the driver's demand may be carried out.

Note that, as apparent from the purpose of setting the lower limit of the target input side rotation speed (target motor rotation speed tNm), without the rotation speed increasing control to achieve the target input side rotation speed with lower limit set (target motor rotation speed tNm), the situation would occur in which the slip rotation detection of the second clutch 7 (CL2) is impossible because of the clutch output rotation speed being too low to be detected by the sensor during the vehicle travel at low speed.

On the other hand, as shown in FIG. 10, when the driver does not wish to start the vehicle even after instant t1 with brake being OFF and the accelerator pedal opening Apo being "0", so that the target driving force is equal to or less than the gradient load, the upper limit value of the target input side rotation speed (target motor rotation speed tNm) is set to a motor rotation speed (input side rotation speed) with which motor/generator 5 would not be supplied an excessive current, i.e., at a motor rotation speed (input side rotation speed) below the slip detection enabling limit value $\omega_{LIM}$.

Therefore, heat generation of the second clutch will be prevented from increasing due to the excessive current to the motor/generator 5 so that, in place of the drivability the driver is not currently demanding, control with emphasis on the heat generation suppression of the second clutch 7 (CL2) may be performed.

Therefore, in a gradient load corresponding driving force control system in the present embodiment, in response to the vehicle start/stop operation, the target input side rotation speed (target motor rotation speed tNm) is switched in the manner described above so that, irrespective of the variations in control characteristics of the second clutch 7 (CL2), both the drivability required at the time of vehicle start and suppression of heat generated by the second clutch 7 (CL2) may achieved to be compatible to each other.

Also, according to the present invention, since the target transfer torque capacity tTc2 of the second clutch 7 (CL2) is set as the target drive torque, and this target transfer torque capacity tTc2 is corrected in accordance with the motor torque at the time of rotation control, during the MWSC mode of operation, the target drive torque of the driver's demand may be achieved despite the changes or variation in the control characteristics.

In addition in the present embodiment, when setting the target transfer torque capacity tTc2 of the second clutch 7 (CL2), offsetting in the capacity excessive side with respect to the target drive torque is provided in view of the change over time or variations of the control characteristics of the second clutch 7 (CL2), even at an extremely low vehicle speed at which engagement or release of the one-way clutch or the direction of slip rotation of the second clutch 7 (CL2) is not detectable, correction can be performed reliably in consideration of the change or variations in control characteristics of the second clutch 7 (CL2).

Further, in the present embodiment, while the automatic transmission 3 is selecting a transmission step or ratio via one-way clutch, (1) When the input rotation speed is within a region in which the slip rotation of the second clutch 7 (CL2) is detectable,
   (1)-1 at the one-way clutch being in the connected state when the practically available motor torque of the motor/generator (electric motor) 5 obtained in subtracter 64 is less than a transient target motor torque of the motor/generator (electric motor) 5 obtained in calculation section 59, upon the motor torque deviation between these obtained in subtracter 61 being positive value, an increasing correction is implemented, while, when the practically available motor torque is equal to or greater than the target motor torque, upon the motor torque deviation being negative a decreasing correction is implemented so that both the increasing correction and decreasing are implemented to correct the second clutch target transfer torque capacity are implemented,
   (1)-2 at the one-way clutch being in the released state, the correction of the second clutch target transfer torque capacity tTc2 by motor torque will be prevented.
(2) When the input rotation speed is within a region in which the slip rotation of the second clutch 7 (CL2) is undetectable, release of the one-way clutch is detected by motor torque and only the decreasing correction is carried out as correction of the second clutch target transfer torque capacity tTc2.

Therefore, even at extremely low vehicle speed where the engagement or release of the one-way clutch or the direction of the slip rotation of the second clutch 7 (CL2) are not detectable due to the non-linear characteristic of the engagement characteristic of the one-way clutch, the changes or tolerances in the control characteristics of the second clutch 7 (CL2) may be taken into account for secure execution of the correction process.

In addition, when the automatic transmission 3 is placed in the transmission step or ratio which is irrelevant from the one-way clutch,
   (1) when the second clutch 7 (CL2) is in an input rotation region in which the slip ration may be detected, both the increasing and decreasing corrections are implemented as correction of the second clutch target transfer torque capacity tTc2 by motor torque, and
   (2) when the second clutch 7 (CL2) is placed in the input rotation region in which the slip rotation of the second clutch 7 (CL2) may not detected, since the polarity of the slip rotation of the second clutch 7 (CL2) is unknown, irrespective of the polarity of the slip rotation, only a decreasing correction is implemented as the correction or corrective measure of the second clutch target transfer torque capacity tTc2 by motor torque.

Therefore, even at the extremely low speed where the direction of the slip rotation of the second clutch 7 (CL2) may not be detected, the change or variations in control characteristics of the second clutch 7 (CL2) are considered for a reliable execution of the correction process.

In addition, in the present embodiment, in the correction of the second clutch target transfer torque capacity tTc2 by the motor torque, since the correction is implemented considering friction regarding the input shaft and a viscosity resistance in accordance with transmission oil temperature for scheduling, the accuracy in correction of the second clutch target transfer torque tTc2 may be improved.

Note that in the embodiment described above, the invention is described for a hybrid vehicle in which the vehicle has engine 1 (such as internal combustion engine) and a motor/generator 5 as power or driving source. However, the present invention is similarly applicable to a vehicle equipped only with engine or rotational machine, and in this case as well, it is evident that the same operations effects are obtainable.

Also, in the embodiment described above, as described with reference to FIG. 6, a gradient load is obtained by the calculation section 41 based on the road surface gradient or inclination θ, and depending on whether or not the target drive torque obtained in calculation section 31 exceeds this gradient load, a determination is made whether the drivability emphasized control for the vehicle start up or the clutch heat generation suppression control for the vehicle stopped state may be determined. Needless to say, the calculation section 41 to acquire the gradient load from the road surface gradient θ and the determination above may be made based on the magnitude of the roar surface gradient θ, per se.

The invention claimed is:

1. A driving force control system for a vehicle having a starting clutch between an electric motor and drive wheels in which a driving force may be controlled by a transfer torque capacity of the starting clutch when the vehicle is in a motor wet start clutch mode, and a first clutch disposed between the engine and the electric motor, comprising an integrated controller configured to:
    calculate a target driving force of the vehicle based on a vehicle speed and an accelerator opening;
    detect a road surface gradient during travel of the vehicle from a road gradient sensor;
    calculate a gradient load exerted on the vehicle by the road surface gradient; and
    perform rotation speed control of the electric motor, suppressing heat generation of the starting clutch, by:
        comparing the gradient load and the target driving force;
        when the target driving force exceeds the gradient load, setting a lower limit of a target input side rotation speed of the starting clutch higher than a slip detection enabling limit, at which a slip rotation indicating a difference over an output side rotation speed is detectable, to provide a driving force to the electric motor to overcome the gradient load; and
        when the target driving force is equal to or less than the gradient load, setting an upper limit of the target input side rotation speed of the starting clutch below the slip detection enabling limit to avoid excessive current to the electric motor.

2. The driving force control system for a vehicle as claimed in claim 1, wherein the integrated controller is further configured to set the target transfer torque capacity of the starting clutch as the target driving force during rotation speed control.

3. The driving force control system as claimed in claim 1 further comprising an automatic transmission provided between the electric motor and the drive wheels, wherein when the automatic transmission is selecting a transmission ratio via a one-way clutch, and
    (1) when the slip rotation of the second clutch is in a rotation speed region in which the slip rotation of the second clutch is detectable,
        (1)-1 and the one-way clutch is being engaged, as correction of the second clutch target transfer torque capacity by motor torque, when an available motor torque of the electric motor is less than a transient target motor torque of the electric motor, the integrated controller is further configured to implement an increasing correction, while, when the available motor torque is equal to or greater than the target motor torque, a decreasing correction is implemented,
        (1)-2 and the one-way clutch is being released, the integrated controller is further configured to inhibit the correction of the second clutch target transfer torque capacity by motor torque, and
    (2) when the slip rotation of the second clutch is in an undetectable region, release of the one-way clutch is detected by motor torque, and the integrated controller is further configured to implement the decreasing correction only as the correction of the second clutch target transfer torque capacity.

4. The driving force control system as claimed in claim 1, further comprising an automatic transmission provided between the electric motor and the drive wheels, wherein when the automatic transmission is in a transmission ratio in which a one-way clutch is not involved, and
    (1) when the slip rotation of the second clutch is in a detectable region, as correction of a second clutch target transfer torque capacity by motor torque, when an available motor torque of the electric motor is less than a target motor torque of the electric motor, the integrated controller is further configured to implement an increasing correction, while, when the available motor torque is equal to or greater than the target motor torque, a decreasing correction is implemented, and
    (2) when the slip rotation of the second clutch is in an undetectable region, irrespective of the polarity of the slip rotation, the integrated controller is further configured to implement only the decreasing correction as the correction of the second clutch target transfer torque capacity by motor torque.

5. The driving force control system for a vehicle as claimed in claim 2, wherein the integrated controller is further configured to correct the target transfer torque capacity of the starting clutch by adding to the target driving force an offset amount on an excessive capacity side of a target torque capacity of the starting clutch.

6. The driving force control system as claimed in claim 5 wherein the integrated controller is further configured to correct the target transfer torque capacity of the starting clutch by motor torque based on an input shaft friction and input shaft viscosity resistance with respect to transmission oil temperature.

* * * * *